L. S. HACKNEY.
MOTOR PLOW.
APPLICATION FILED SEPT. 19, 1910.
1,074,115.
Patented Sept. 30, 1913.
3 SHEETS—SHEET 1.
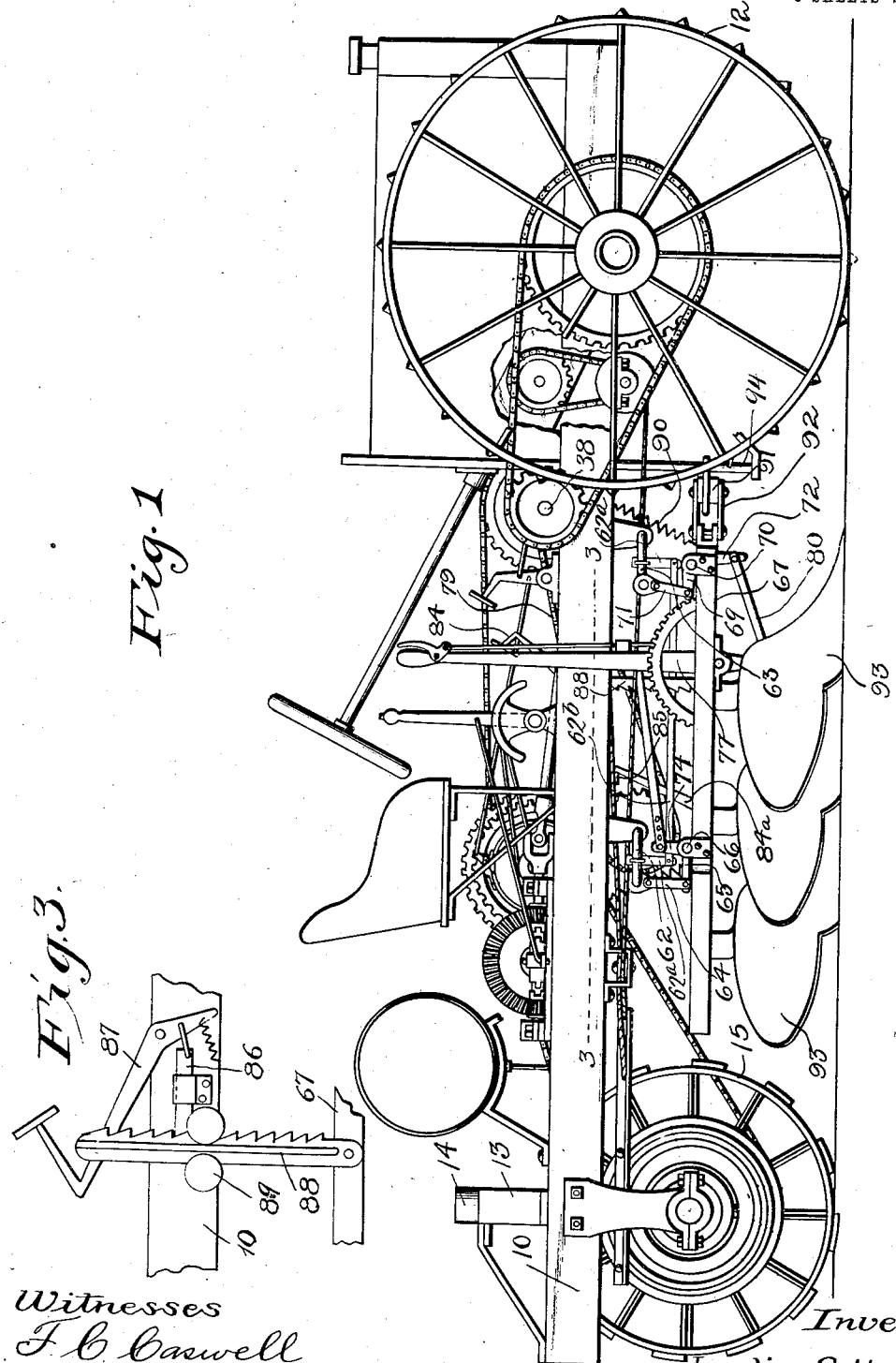

L. S. HACKNEY.
MOTOR PLOW.
APPLICATION FILED SEPT. 19, 1910.
1,074,115.
Patented Sept. 30, 1913.
3 SHEETS—SHEET 2.
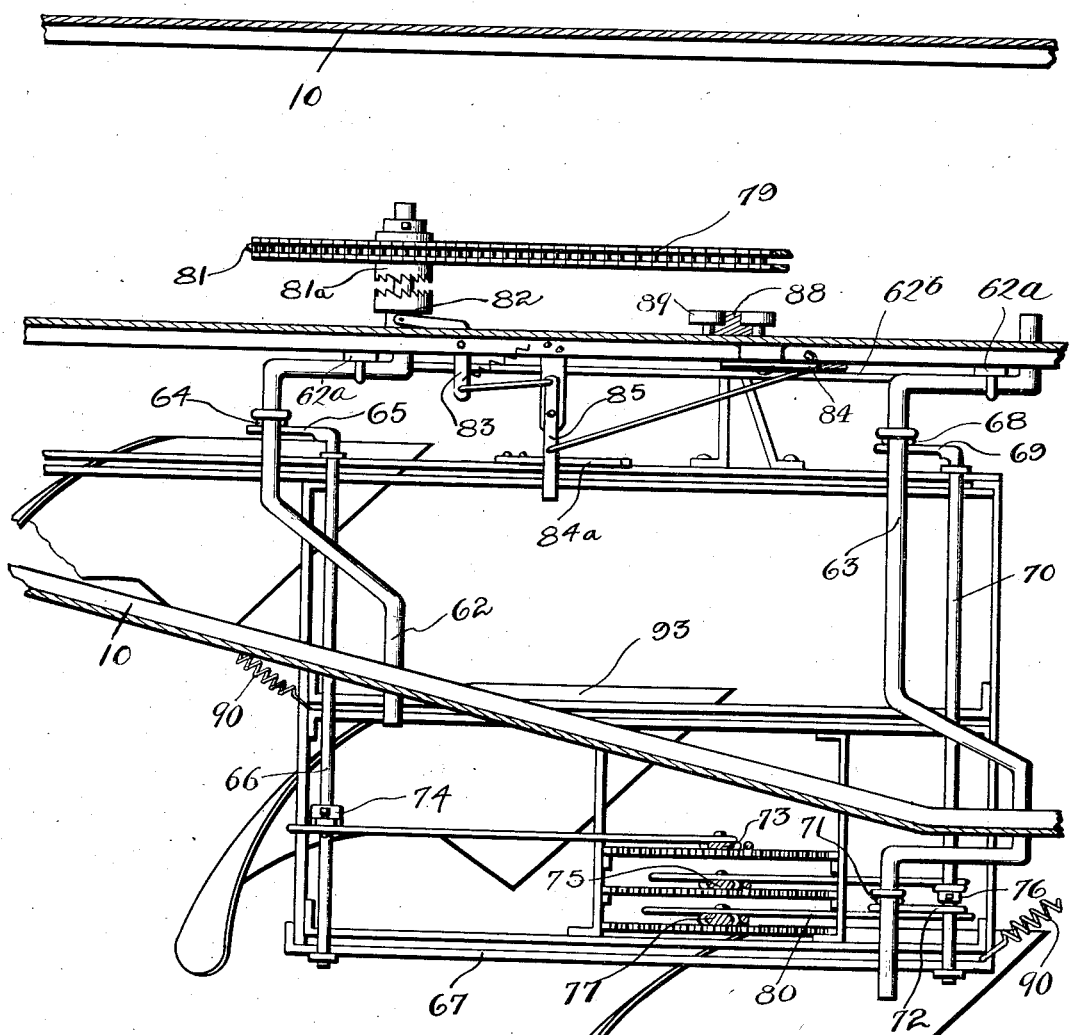
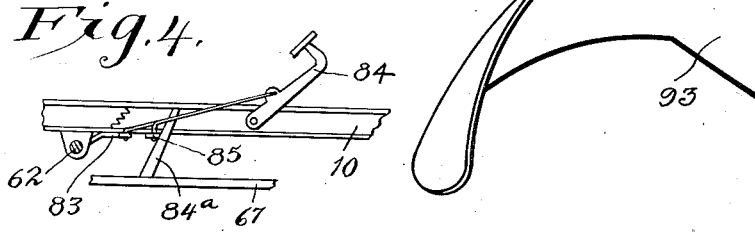
Witnesses
F. C. Caswell
K. H. Hansen
Inventor
Leslie S. Hackney
by John E. Stryker atty.

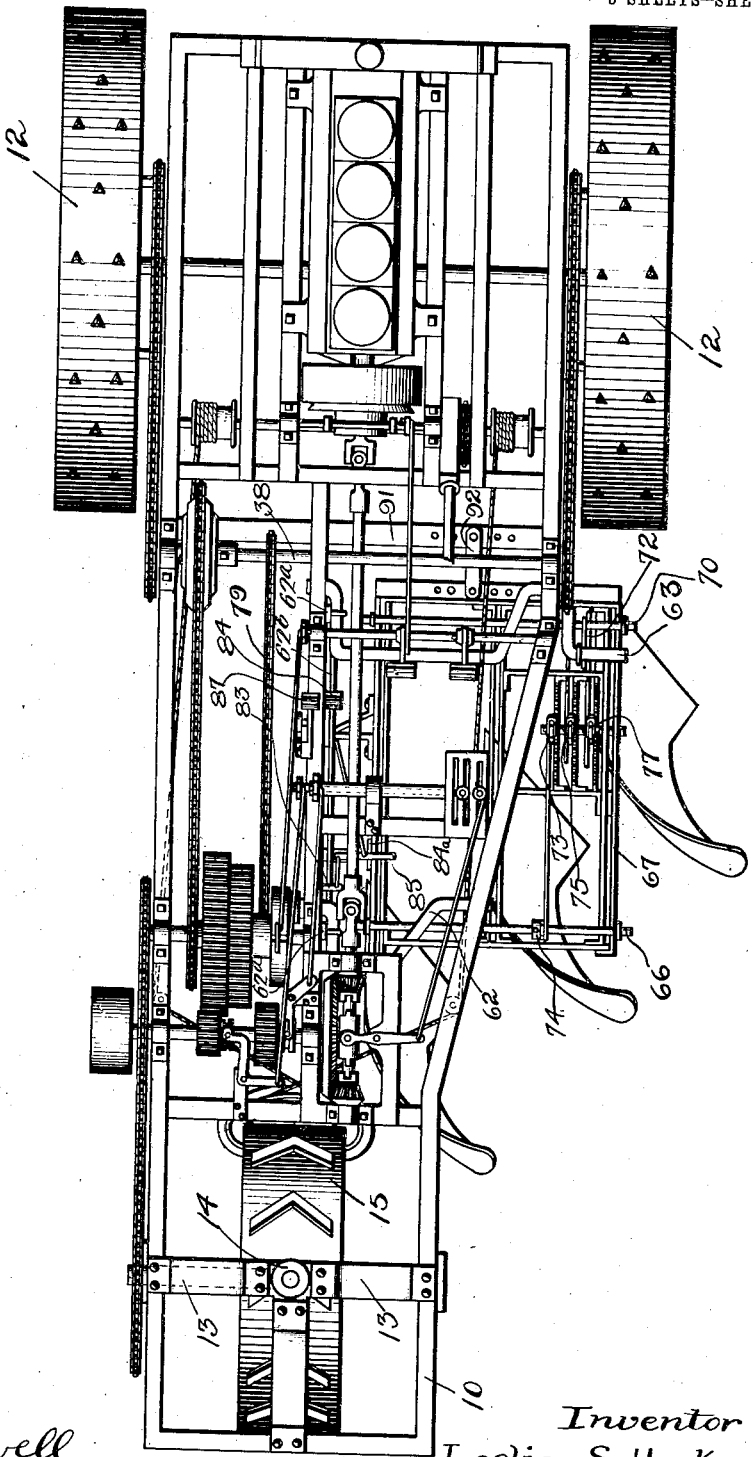

UNITED STATES PATENT OFFICE.

LESLIE S. HACKNEY, OF ST. PAUL, MINNESOTA.

MOTOR-PLOW.

1,074,115.  Specification of Letters Patent.  Patented Sept. 30, 1913.

Application filed September 19, 1910. Serial No. 582,734.

*To all whom it may concern:*

Be it known that I, LESLIE S. HACKNEY, a citizen of the United States, residing at St. Paul, in the county of Ramsey and State of Minnesota, have invented new and useful Improvements in Motor-Plows, of which the following is a specification.

My invention relates to improvements in motor plows.

The object of my invention is to provide a plow of this type, light, simple and durable in construction, and having its traction and plow control within easy access of a single operator.

A further object of my invention is to provide such a plow supported upon traction wheels, arranged out of the path of the furrows.

A further object is to provide a self-propelling plow, having a plow frame designed to be lifted by power and to be quickly and easily tilted, laterally and longitudinally beneath the frame of the machine.

Figure 1 is a side elevation of my improved motor plow; Fig. 2 is a sectional view taken on the line 3—3 of Fig. 1; Fig. 3 is a detail view showing the device for releasing the plow frame; and Fig. 4 is a detail view showing the stop adapted to limit the upward movement of the plow bodies, and Fig. 5 is a plan view of the motor plow.

Referring to the accompanying drawings, I have used the reference numeral 10 to indicate the main frame. The traction wheels 12 are journaled on the main frame 10 and support its forward end. The brace bars 13 fixed to the main frame 10 support the bearing 14, in which the combination traction and steering wheel 15 is mounted. The shaft 38 is rotatably mounted on the main frame 10 and is driven from a motor on the forward end of said frame. Cranks 62 and 63 are mounted as shown in Fig. 1 below the main frame 10. The crank 62 is connected by the link 64 to the crank 65 on the shaft 66 which is rotatably mounted on the plow frame 67. The crank 63 is connected by the link 68 with the arm 69 on the shaft 70 which is also rotatably mounted on the frame 67 and by the link 71 with the bell crank 72 which is loosely mounted on said shaft 70. The arms 62ª are rigidly connected to the cranks 62 and 63 at one end and are pivotally connected at their other ends to the bar 62ᵇ, said arms and bar being adapted to move said cranks 62 and 63 similarly and simultaneously. The lever 73 mounted on the frame 67 is connected with the arm 74 which is fixed to the shaft 66 and moves the rear end of the plow frame to different positions of its adjustment relative to the crank 62. The lever 75 on the frame 67 is connected to the arm 76 which is fixed to the shaft 70 and moves the forward landside corner of the plow frame to the different positions of its adjustment relative to the crank 63. The lever 77 on the frame 67 is connected by the link 80 to one end of the bell crank 72 and moves the furrow side, forward end of the frame to its different positions of adjustment relative to the crank 63.

The chain 79 connects a sprocket wheel on the shaft 38 with the sprocket wheel 81 rotatably mounted on the crank 62. The sliding clutch member 82 feathered on the crank 62 is operated by a spring-actuated bell crank 83, and is designed to mesh with the clutch member 81ª on the sprocket wheel 81. The clutch member 82 is operated by the pedal 84 to raise the frame 67, while the obliquely mounted bar 84ª on the frame 67 is arranged to engage the lever 85, which is connected to the bell crank 83 to disengage the clutch member 82 and thus stop the movement of the frame 67 when at its upper limit. The pawl 86 slidably mounted on the frame 10 and operated by the spring-actuated pedal 87, is designed to engage the toothed bar 88 which is pivoted to the plow frame 67. Said bar 88 passes upwardly through the guide rollers 89 on the frame 10 and is designed to hold the plow frame against downward movement in any position of its adjustment. Springs 90 are arranged between the main frame 10 and the plow frame 67 to partially counteract the weight of the latter. The draw bar 91 slidably mounted on the rods 94 beneath the frame 10 is connected by the links 92 with the plow frame 67, said arrangement of parts being designed to receive and transmit the draft from the plow frame 67 to the main frame in all positions of its travel, thus relieving the supporting cranks 62 and 63 from any unnecessary strain. Plows 93 of common form are under-hung from the plow frame 67.

In practical operation the plow frame 67 is released and lowered by operating the pedal 87 and is brought into contact with the ground surface. The levers 73, 75 and 77 are then adjusted to secure the desired working depth or side draft of the plows. When desired, the operator may raise the plow frame by pressing the pedal 84, and thus cause the crank 63 to be rotated, said operation being stopped by the bar 84ª on the plow frame 67 as described. The plow frame retains its adjustment when again lowered for plowing.

Having described my invention, what I claim as new and desire to protect by Letters Patent is:

1. In a plow of the class described the combination of a main frame, supporting wheels therefor, a plow frame carrying plows beneath said frame and between said wheels, a swinging support on the main frame for the plow frame and means for adjusting said plow frame vertically with respect to said support.

2. In a plow of the class described the combination of a main frame, supporting wheels therefor, a plow frame carrying plows beneath said frame and between said wheels, power driven cranks on the main frame for lowering and raising said plow frame, means extending above the main frame for adjusting the plow frame vertically with respect to said cranks and a draw bar connecting said frame.

3. In a plow of the class described the combination of a main frame, supporting wheels therefor, a plow frame beneath the main frame and between the wheels, plows on said frame, a pair of power driven cranks on the main frame for raising and lowering the plow frame, levers on said frame for adjusting the forward end of said plow frame relative to one crank and the rear end of said frame relative to the other crank.

4. In a plow of the class described the combination of a main frame, supporting wheels therefor, a plow frame carrying plows beneath the main frame and between the wheels, cranks on the main frame, connecting means between the cranks and plow frame, said cranks being adapted to raise and lower said plow frame, and levers for operating said connecting means whereby said plow frame is adjusted vertically with respect to said cranks.

5. In a plow of the class described the combination of a main frame, supporting wheels therefor, a plow frame carrying plows beneath the main frame and between the wheels, power driven cranks on the main frame, transverse shafts rotatable on the plow frame, arms on said shafts, links connecting said arms and cranks, a second set of arms on said shafts, and levers connected with said last mentioned arms for moving the same and rotating said shafts whereby the plow frame is adjusted with respect to said cranks.

6. In a plow of the class described, the combination of a main frame, wheels journaled thereon, a plow frame carrying plows, movable supports on the main frame forming a mounting for the plow frame and levers on said plow frame for tilting the same laterally and longitudinally on said supports.

In testimony whereof, I have signed my name to this specification in the presence of two subscribing witnesses.

LESLIE S. HACKNEY.

Witnesses:
ASHLEY COFFMAN,
LOUIS JOHNSON.